Figure 5:
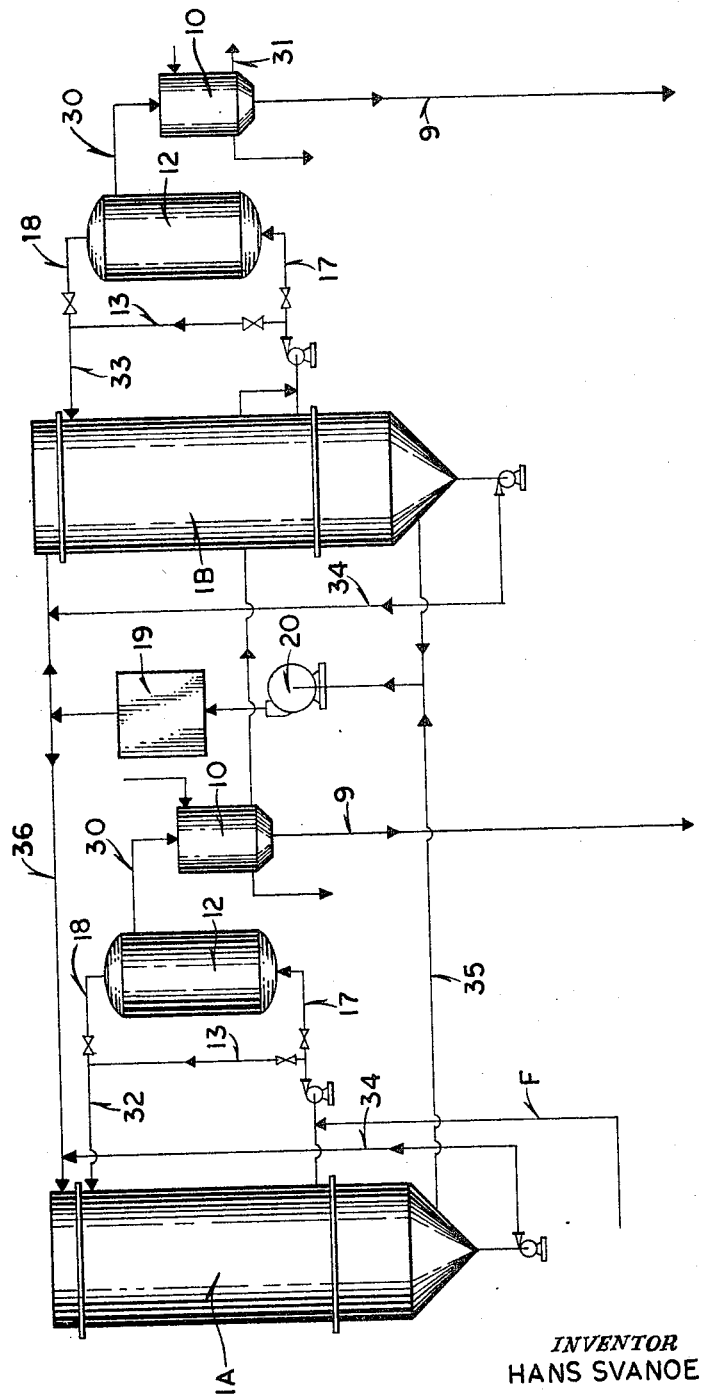

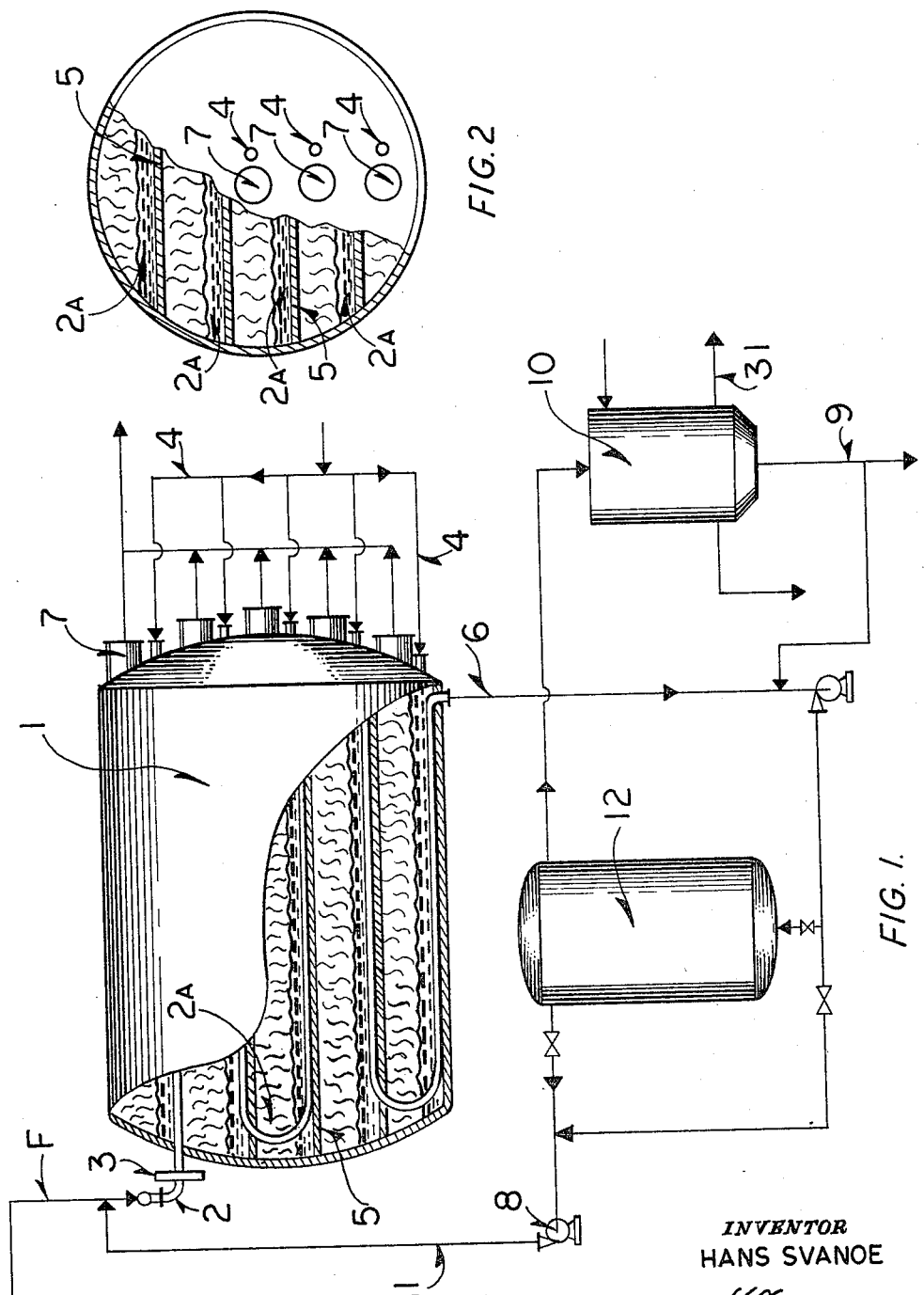

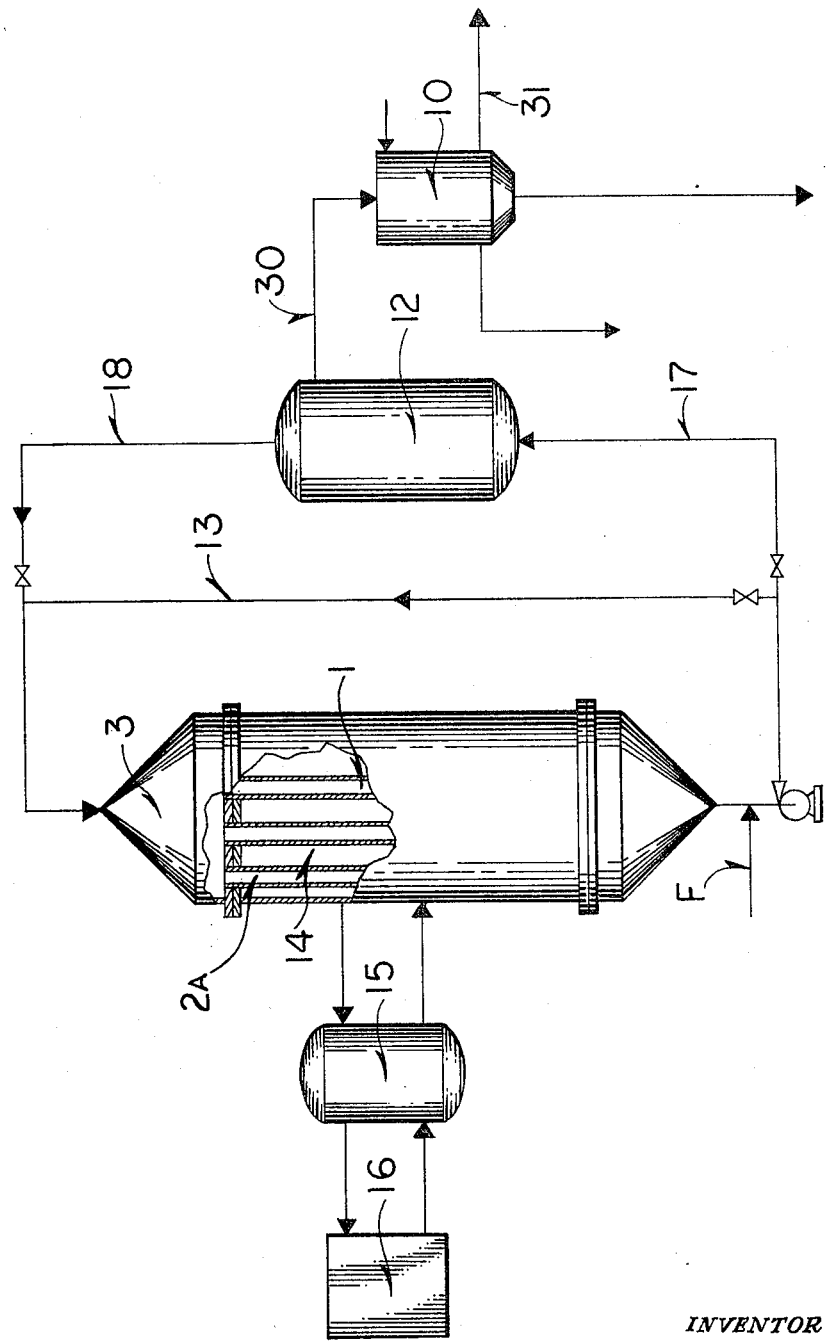

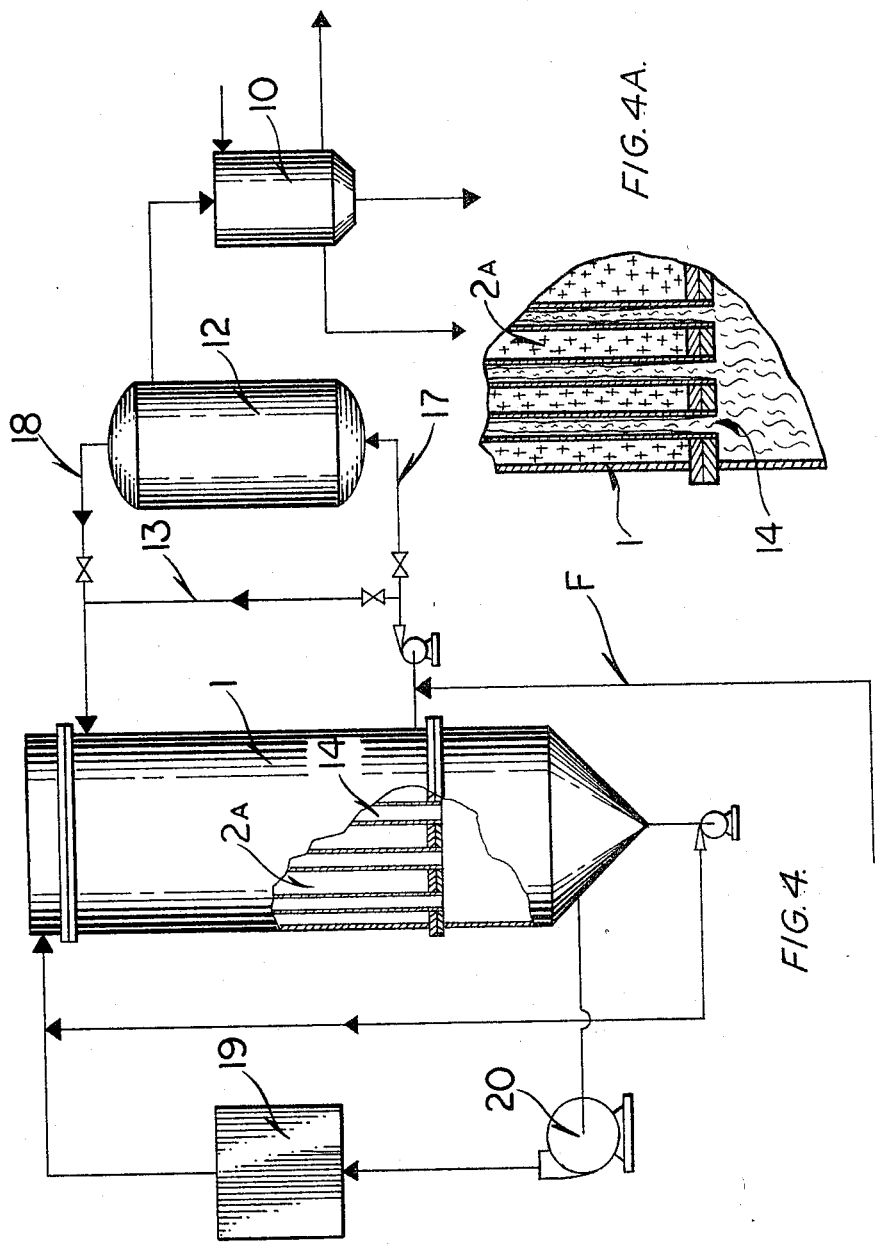

3,285,021
CONCENTRATION OF EXTRACTS BY FREEZING WITH RESIDENCE CRYSTAL GROWTH
Hans Svanoe, Warren, Pa., assignor to Struthers Scientific and International Corporation, New York, N.Y., a corporation of Delaware
Filed Nov. 5, 1962, Ser. No. 235,355
9 Claims. (Cl. 62—58)

This invention relates generally to a process of subjecting solutions to solute concentration by crystallization and more particularly relates to freezing comestible extractions and to the concentration of solutes while removing the solvent through crystallization.

The prior art describes processes in which the solvent in certain solutions is frozen and the crystals formed separated, thus either concentrating the solution or liberating the solvent from the solution. In carrying out such processes in accordance with certain prior art disclosures, the solution may contact a heat transfer surface each, for example, as the surface of an internally cooled drum which is immersed in the solution, or may contact the inner surface of an externally refrigerated cylinder. The solvents of these solutions under precribed conditions, freeze out of the solutions in the form of ice on the cool-surfaces of the heat exchanger. Other methods have been disclosed for the removal of the solvents by crystallization in which droplets of an immiscible liquid or particles of an insoluble solid, cooled below the freezing point of the solution are continuously introduced in the solution and the droplets or particles incased in the frozen solvent continously removed from the solution. After removing the frozen solvent by liquifying with heat the droplets or particles are again cooled and the operation repeated.

In the processes of the art such as those briefly described above, efficient operation suffers due to the unconscionable amount of the concentrate that is carried away by the ice on or in the refrigerating drum or on or in the crystals formed and removed from the concentrate. Recovery of the concentrate, occluded or retained on the ice, by washing extraction or other means frequently dissolves the solvent crystals, thus diluting the concentrate. This reduces the economic value of such recovery steps. The process of the subject invention obviates these and other difficulties and advances the art of concentrating a solute by removing the solvent by an improved crystallization process.

Objects of the invention include: an improved process for the concentration of potable concentrates and for the concentration of citrous liquids by a controlled crystallization process; the crystal and environmental control of such processes to produce dense ice crystals from fruit, vegetable, and comestible extract; the maintenance of a uniform refrigeration environment in which to provide the nucleation of ice crystals from potable liquids and comestible extracts and the growth of crystals resulting therefrom; the concentration of solutes by freezing and an improved process of separating concentrates from ice. Other objects and advantages of the invention will hereinafter appear.

The invention will be more readily understood by reference to the attached drawings in which like parts have like numbers throughout.

FIG. I represents, diagrammatically a process including, in an elevation view, a crystallizer, in partial cut-away section, used in the process of the invention in which a comestible extract, a potable liquor, a solution or the like, and more particularly an extract made from vegetable or fruit tissue of various fruits, such as oranges, lemons etc., or fruit plants including the seed and seedlike fruit from cereal grass, as wheat, maize, oats by expression, maceration, digestion, infusion with or without a suitable aqueous or non-aqueous solvent (hereinafter generally referred to as an extract or extracts), are concentrated to a more easily transported form for ultimate consumption as a concentrate or after dilution of a concentrate.

FIG. II represents, the crystallizer of FIG. I by a view in end elevation also in partial cut-away section, to reveal the disposition of the means for contacting the solutions being frozen with the heat exchange surfaces.

FIGS. III, IV, and V represent alternate systems of operating the processes of the invention by a modified flow sheet and diagrammatical drawing, the cooler-crystallizers of FIGS. III and IV being in partial cut-away section revealing details of extract and fluid refrigerant flow.

Cooler-crystallizer 1, FIG. I, has a cylindrical shape with dished ends to withstand refrigerant to atmospheric pressure differences, is provided with a series of inlets 2 that feed extract from header 3 into crystallization tubes 2a. Tubes 2a within crystallizer 1 are disposed in indirect heat enchange relationship with a refrigerant introduced into the crystallizer through refrigerant inlets 4. The refrigerant covers trays 5, FIG. II, the refrigerant surrounding the extract containing tubes, the tubes 2a are so positioned that the extract flowing in them can pass through the series of trays 5 from the top to the bottom of crystallizer 1. The concentrate and crystals, as a slurry, formed by freezing of the extract in tubes 2a issue from crystallizer 1 through outlet 6. The refrigerant vapor is discharged from crystallizer 1 through refrigerant outlets 7. Ample vapor space is provided above trays 5 in the processes in which the latent heat of refrigeration of a volatile liquid refrigerent is used. The slurry from the outlet 6 may be returned directly and by pump 8 back to the crystallizer. The discharged slurry from crystallizer 1 is passed into centrifuge 10 for separating ice formed during the crystallization in concentrating the extract. The concentrate thus obtained is sent to storage a portion being returned through pump 8 to crystallizer 1 to provide nuclei for the crystallization.

Alternate methods of operating the processes of the invention are illustrated by FIGS. III, IV and V. In accordance with that shown in FIG. III a precooled extract is introduced through lines F and 13 into header 3 of crystallizer 1. This cooler-crystallizer 1 is of the tubular type. Tubes 2a are surrounded by a refrigerant such as brine circulated through refrigerant chambers 14 and derived from refrigerant storage 15, the refrigerant being maintained at a proper temperature by refrigerant machine 16 of any suitable type. The nucleated and grown crystals formed in tubes 2a by virtue of the turbulent flow of the extract through the tubes while being undercooled to the herein described extent, are recycled through crystallizer 1 and bypass line 13 as a slurry with the mother liquor (the concentrated extract). A portion of the slurry is bled from the recycle by line 30 and fed into retention tank 12. The proportionation of recycle to bleed off effects control of the crystal quantity in tubes 2a. In retainer tank 12 the crystals are subjected to an environment in which the formation of discrete ice crystals is produced by crystal growth and by utilizing the residual undercooling of the slurry. The environment is substantially constant with respect to undercooling and turbulence in order to insure the presence of a uniform average temperature, a uniform distribution of crystals, and as a consequence a uniform growth of crystals by release of the undercooling as heat of crystallization. The crystals are withdrawn through line 30 to a continuous ice-concentrate centrifugal separator 10 wherein the ice is separated from the concentrate, the separated concentrate being sent to storage through product line 31. The ice after separation of the concentrate it washed with water or dilute extract, the wash water being reprocessed, and the ice being used to assist in cooling phases of the process.

The alternate method illustrated by FIG. IV is generally similar to that shown in FIG. III differing therefrom principally in the detailed showing of a falling crystallizer-cooler 1. Cooling is effected by heat exchange of the extract circulating through areas 2a with the film of refrigerant falling by gravity down along the walls and inside tubes 14. The falling film of liquid refrigerant gives up its latent heat of evaporation as it falls to the bottom of crystallizer-cooler 1, the resulting vapors are drawn into refrigerant compressor 20 and then passed to the refrigerant condenser 19. By using a falling film type of refrigerant, the latent heat of evaporation of the liquid refrigerant in heat exchange contact with the extract requires less cooling surfaces for the heat transfer than is required in the use of refrigerate brine for example. Falling film crystallizer-coolers of this type are for a given capacity of cooling orders of magnitude smaller than brine coolers and like means of refrigeration. FIG. IVA is a blown-up showing of the falling film heat exchange surfaces, the liquid film of refrigerant gradually vaporizes as it falls, leaving the bottom of the tubes mostly as vapor. The method shown in FIG. V illustrates diagrammatically a multiple effect system that employs two effects of the falling film type, any suitable number of effects may be used (for falling film type or FIG. I type processes) if found economical, the number of effects are advisedly increased with the increase in capacity of the systems used. It will be noted that the pieces of equipment shown in FIG. V are duplicates of the equipment shown in FIG. III other than the compressor 20 and condenser 19 used for liquifying the vaporized refrigerant. The total amount of refrigeration and freezing is proportioned between the effects, the partially concentrated extract or mother liquor from the first effect centrifuge 10 being passed to the cooler-crystallizer 1 of the second effect. This process may be operated using a temperature of the slurry returned to the first effect 1A from line 32 of about minus 3° C. and the slurry returned to the second effect 1B from line 33 of about minus 12° C. Line 34 carries recycled refrigerant liquid from the bottom to the top of the falling film evaporation surfaces and line 35 carries the refrigerant vapors from the cooler-crystallizers 1A and 1B to the compressor 20 and condenser 19, line 36 transports the liquified refrigerant to the cooler-crystallizers 1A and 1B.

Features of the invention in use of the aforedescribed and equivalent equipment include methods used to freeze ice from an extract, to utilize concurrently the phase change by means of which water in the form of ice is withdrawn from the extract leaving a concentrate (or mother liquor) and thereafter to separate the ice from the concentrate. Indirect heat exchange, i.e. the flow of heat through a heat transfer surface in normal course and if the endothermicity of the heat transfer is sufficient will produce, an ice build-up on heat exchange surfaces that are in contact with the extract. Applicant has discovered that a combination of factors are important in order to maintain high equipment capacity, to insure continuous operation, and to sustain relatively high temperature differences between the cooling medium and the extract being concentrated. Moreover, his process restricts ice formation exclusively to crystal growth on free, i.e. ambulatory nuclei, thus avoiding build-up on heat transfer surfaces. The combination of factors include:

(1) The liquid extract film in immediate contact with the heat transmission surface in the freezing zone is subjected to a relatively high degree of undercooling. During contact the potential ice formation in the form of nuclei is maximum. Even a slight deposit of ice on the heat transfer cooling surface will necessitate either some scraping device on this surface to remove continuously such ice deposit or a stoppage to remove such ice by heating.

(2) The ice concentration in the freezing zone is maintained between about 10% and 30% by weight. This concentration is required in order for the high growth rate of the ice and to make certain that the supercooling is released on crystals in that zone. In addition the formation of new crystals or nuclei is under control at all times.

(3) The total volume available for crystallization within the freezing zone is sufficient to reduce substantially the supercooling within the zone and to maintain the supercooling within 1° C. and preferably less than 0.3° C. below the freezing point of the extract which may be at a temperature as low as −20° C. or lower depending on the kind of extract being frozen. This is achieved by using from 50 to 500 gals. of volume for 1000 lbs. of crystals produced per hour. Preferably about 200 gals. of volume is provided within the freezing zone per 1000 lbs. of crystals produced per hour.

(4) The freezing, or heat transfer, surfaces are highly polished and are made of a non-corrosive material such for example, as stainless steel or silver, or are silver lined metal surfaces.

(5) The fluid motion within the freezing zones (the tubes of the crystallizers in the drawings), is maintained in a turbulent state and critical velocities necessary to maintain that state, e.g. 3 to 10 ft. per sec. and preferably 6 to 8 ft. per sec. used for tubes having inside diameters between 1″ to 4″ inches. A fluidized state is maintained in the crystal growing zones 12.

Under certain circumstances, and especially in the treatment of extracts that are highly dilute say 2% by weight or less of solids and as a consequence require the removal of large amounts of water to effect the desired degree of concentration, it is recommended that some of the undercooling (i.e. cooling of the extract below its freezing point), be released by crystallization outside the field of the cooling medium (e.g. outside crystallizer 1, and to an extent up to about 50% of the remaining undercooling i.e. the undercooling not released in the cooler-crystallizer 1. Operation of the process of the invention in accord with this feature is preferably accomplished by having a growing chamber (growing zone) of suitable proportions positioned down stream from the cooler-crystallizer (freezing zone) and located for optimum results before any fresh feed is added to the concentrate. Growing of crystals occurs in both zones but little nucleation due to undercooling occurs in the growing zone. By operation with a crystal growing chamber, separate from the cooler-crystallizer a constant environment can be maintained in that chamber wherein by appropriate means and adequate insulation a temporal and spacial environment substantially constant with respect to the temperature of release of the undercooling and the turbulence can be assured for optimum operation of the process.

Not only is it important to have the nuclei present when the extract is at a temperature at which crystals will form but also important that the number of nuclei should be capable of absorbing and in position to absorb the heat of crystal formation and a crystal growth. Optimum utilization of the invention involves having the nuclei present in quantity and undercooling at the allowable maximum uniformly distributed temporally and spacially in the extract. The nuclei are introduced into the cooler-crystallizer with the extract, formed in situ or otherwise provided. Uniform distribution is induced by a turbulent state which avoids non-nuclei crystallization, i.e. points of crystallization as the sharp corners of the equipment, rough surfaces, and other possible crystal forming protuberances of the heat transfer surfaces.

Nuclei can be introduced into the extract through the auxiliary inlet 11 FIG. I or be provided by the nuclei from the centrifuge 10 recycle, which is fed into the extract feed header 3, or tubes 2 in which the extract has been precooled by an suitable means provided, prior to or in the headers, to a temperature of about 0° C. Suitable turbulence to give the special (and temporal) requirements is attained by insuring that the recycling capacity of pump 8 or equivalent means is at least ample, taking into consideration the configuration, size, fluid-solid flow (slurry flow), viscosity of the extract and other essential chemical engineering factors to provide turbulent state flow velocities (i.e. critical velocities) in the crystallization tubes 2a. By the provision of nuclei within the crystallizer and uniform distribution of the nuclei throughout the extract, as well as means for introducing additional nuclei at suitable positions in the crystallizer at which surface crystallization might otherwise occur, the ice crystals are held in suspension with substantially free flow through the crystallizer and are fully discharged with the concentrate from the crystallizer.

Nuclei introduced not only grow crystals within the crystallizing extract but also produce the desired crystal form and habit. The crystals should be compact in density and discrete in association in order to be separated readily by centrifuge or other means from the adhering concentrate. The natural tendency is for water and also extracts to form ice at very rapid rates and to form ice as snow-like crystals. Such crystals in contradistinction to the crystals produced by the process of the invention are neither compact in density nor discrete in character; and moreover, snow-like crystals occlude and tenaciously hold and retain undesirable amounts of concentrate when such crystals are produced in concentrating extracts.

Discrete ice crystals are produced in extracts and in accord with the invention by nucleating and growing the crystals under a restricted range of temperatures. The temperature in the crystallizing extract is held within a narrow temperature range that is below the freezing temperature of the concentrating solution. This temperature is below 0° C. and is maintained practically constant at a temperature slightly below the freezing point of the extract. Dense crystals are created by holding the temperature difference between the heat exchange medium and the equilibrium freezing point of the extract such that between 200 to 1500 B.t.u. per square foot per hour is transferred through the heat transfer surface and from the freezing extract to the heat exchange medium. The cooler-crystallizer 1 and especially retainer 12 and its crystallization tubes together with the ratio of heat transfer to feed are adjusted and arranged to permit ample time for the production of discrete crystals together with flow velocity capacity to insure turbulence and/or fluidization throughout the crystallizing environment.

In the substantially constant temperature environment of crystallization the supersaturation or undercooling of the extract, is allowed sufficient time to be released on the nuclei present in the extract and to grow on the discrete ice crystals as they are formed. Upon release of this supersaturation the concentrate is separated from the ice by centrifugal force, filtration or other suitable means. A portion of the concentrate or a mixture of the concentrate with the slurry, prior to separation, may be used as the nuclei (other nuclei may be used such as dense discrete ice crystals in dilute precooled extract or concentrate) and is introduced into the crystallizer with the raw extract. The remainder of the concentrate is sent to storage.

The form, discretion, and habit of the crystals follow closely the precision with which the constancy is maintained during the crystallization. Compact and dense crysals produced by a temporal and spacially constant environment are more readily washed free of concentrated extract. With optimum control of the nucleation and crystal growth under the preferred conditions of such operations discrete crystals are produced that are hexagonal, are of the ditrigonal-pyramidal class and have the compact dense form most favorable for washing to recover adhering concentrate without undue melting of the ice during the washing step. The production of discrete ice particles is also promoted by the precision with which the rate of heat transfer is controlled, i.e. the release of heat is so adjusted that the heat flow maintains the extract in the zones of crystallization at a temperature within the range of 1° C. and preferably less than 0.3° C. of the equilibrium temperature of the extract described above. In the specification and claims by the phrase equilibrium temperature of the freezing extract is meant the average crystallization end point of the extract. Optimum capacity is obtained by adjusting the heat flow to decrease the temperature at any one freezing stage commensurate with the increase in concentration of the extract. The temperature decrease is produced by known means such for example as by lowering the pressure on the refrigerant if ammonia or an equivalent vaporizable refrigerant liquid is used or decreasing the temperature of non-volatile coolants such as brine or a hydrocarbon which is forced into crystallizer 1.

The process is operated by introducing an extract precooled to a temperature approaching 32° F., into the crystallizer the extract comprising for example fruit juices such as: orange, lemon, pear, grape, apple and guinabana; potable liquors i.e. wine, beer; vegetable juices, e.g. tomato, carrot, cabbage, onion, and beet; and other comestible extractions containing potable liquids. A refrigerant such as liquid anhydrous ammonia is forced into crystallizer 1 under a pressure and temperature such that the refrigerant in trays 5 vaporizes and releases its latent heat of evaporation through the heat transfer surfaces of tubes 2a to the extract.

Orange juice concentrate for sale as frozen juice is prepared by squeezing oranges followed by customary separation of the pulp and concentrating the juice by this process. The natural juice is chilled to about 0° C. and passed through headers 3 into the crystallizer 1. In the header 3 the juice is mixed with some concentrate returned from the centrifuge. The juice-nuclei concentrate mixture is passed through tubes 2a which contain 100–500 square feet of heat exchange surface per 1000 pounds of ice crystals produced from the juice per hour. The temperature of the extract in crystallizer 1 is held a fraction of a degree centigrade below its ice-equilibrium temperature. After separating the crystals formed in the centrifuge the resulting concentrate is either passed to the next freezing stage or to storage.

Multi-effect or step wise crystallization is indicated in the concentration of those extracts that are very dilute. The temperature in the different effects as well as the number of effects employed are dependent on the percentage concentration of the juice desired in the product concentrate. For example, in the preparation of a final orange juice concentrate containing 50% solids by weight, and using three effects, the temperatures in the crystallizers may be; first effect minus 3° C.; second effect minus 8° C.; and the third effect minus 12° C. In relatively large installations four or even more effects can be used. For relatively small production many stages are not usually justified, due to the cost of extra piping and auxiliary equipment required. Multi-effect freezing with the vaporizer-cooler-crystallizer design as shown in some detail in FIG. V, has been demonstrated to be remarkably satisfactory.

The centrifuged discrete crystals are preferably freed from adhering concentrate by washing with precooled extract feed which wash water extract is added to the header 3 or tubes 2a to augment the supply of nuclei, as already indicated, and to recover extract otherwise retained on the crystals. The nuclei should on the one hand be sufficient in quantity to provide points of crystallization throughout the cooled extract for release of the heat of crystallization in the formation of discrete ice crystals. Too great a quantity of nuclei will result in too many crystals of undesirable size. By restricting the number of crystals the heat will be released in producing large crystals and not in producing an equivalent weight of small crystals. The number of nuclei should therefore be less than the number that will produce crystals having an average size of less than about 0.8 mm., which is the minimum size for efficient handling of the crystals.

Efficient concentration of comestible, imbibable, and other extracts by the process of the invention stems from the formation during the concentration of granular ice crystals having a high bulk density. Water of course will crystallize in the form of snow-like crystals having an extremely low bulk density. Snow-like crystals will hold tenaciously any retained extract or concentrated solute. An economical process for the concentration of the solutions described herein is operated under close tolerance that avoid the formation of snow-like crystals. The process of the invention produces superior crystals by crystallization in a substantially constant environment. The solute is nucleated and some crystals grown on the nuclei the concentration being conducted under strict control of temperature conditions. Moreover, crystals are produced as discrete particles and are subjected to crystal growth also under strict control and importantly in the practical absence of localized heating and cooling effects due respectively to controlled introduction of the extract and controlled latent heat vaporization of the refrigerant.

The process, apparatus, and conditions described may be modified in many ways within the purview of the invention as herein disclosed and claimed without departing from the invention or without operating outside the scope of the claims.

I claim:
1. In a process for concentrating aqueous products by removing ice therefrom the steps comprising:
    (a) cooling an aqueous product in the presence of ice forming nuclei in indirect heat exchange with a volatile refrigerant by passing said aqueous product through tubular parallel flow paths, in a folded zig-zag pattern, submerged in a pool of said refrigerant, to form an ice slurry, each flow path comprising at least three connected horizontal legs;
    (b) maintaining each leg in a pool of liquid refrigerant, supplied thereto in parallel paths;
    (c) withdrawing refrigerant vapor from each pool of refrigerant in parallel paths to cool the refrigerant pool;
    (d) withdrawing the ice slurry from the heat exchanger;
    (e) passing a portion of the ice slurry to a retention zone for growth of crystals;
    (f) returning the remaining portion of the ice slurry containing nuclei to the cooling step (a); and
    (g) separating ice slurry into ice and concentrated aqueous product by centrifuging.

2. The process of claim 1 in which the cooled extract of step (a) is added to a crystallization zone and crystallization conducted on a limited amount of nuclei on which a substantial part of the heat of crystallization is released in crystal growth.

3. The process of claim 2 in which the cooled product of step (a) is added to a continuously operated ice crystallizer zone.

4. The process of claim 1 in which endothermicity produced by the indirect heat treansferred to the product is sufficient to propogate the release of the heat of crystallization of the discrete ice crystals.

5. The process of claim 3 in which the nucleation and crystallization zone is refrigerated by 100 to 500 square feet of heat exchange surfaces per 1000 pounds of ice crystallized per hour from the extract.

6. The process of claim 1 in which the temperature difference between the heat transfer medium and the concentrated product in the turbulent slurry of step (d) is between 1° C. and 5° C.

7. The process of claim 1 in which the crystal growth of step (a) is conducted at a temperature between minus 1.5° C. and minus 20° C.

8. The process of claim 1 in which a substantial proportion of the discrete ice crystals have an average size of at least 0.8 mm.

9. The process of claim 1 in which the magnitude of heat exchanged from the product to the cooling medium is between 200 and 1500 B.t.u. per square foot of heat exchange surface per hour.

References Cited by the Examiner
UNITED STATES PATENTS

| | | | |
|---|---|---|---|
| 2,013,025 | 9/1935 | Bottoms | 62—58 X |
| 2,559,205 | 7/1951 | Wenzelberger | 62—58 |
| 2,672,487 | 3/1954 | Tegge. | |
| 2,735,779 | 2/1956 | Wenzelberger | 62—58 |
| 2,881,230 | 4/1959 | Buell. | |
| 2,896,419 | 7/1959 | Thompson | 62—58 |
| 3,098,734 | 7/1963 | Svanoe | 62—58 |
| 3,098,735 | 7/1963 | Clark | 62—58 |
| 3,170,778 | 2/1965 | Roth | 62—58 |

NORMAN YUDKOFF, *Primary Examiner.*